United States Patent Office 3,050,553
Patented Aug. 21, 1962

3,050,553
DISULFAMYLBENZOIC ACIDS
Frederick C. Novello, Lansdale, Pa., assignor to Merck & Co., Inc., Rahway, N.J., a corporation of New Jersey
No Drawing. Filed Nov. 14, 1958, Ser. No. 773,825
4 Claims. (Cl. 260—515)

This invention is concerned with novel disulfamylbenzoic acid compounds which contain at least one additional substituent attached to the benzene nucleus and with methods for preparing these compounds. The structural formula of the new compounds of this invention can be illustrated as follows:

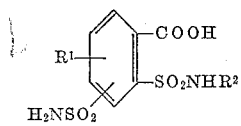

The novel disulfamylbenzoic acid compounds of this invention therefore comprise compounds having a structure as illustrated above, and include their non-toxic alkali metal and alkaline earth metal salts as well as the ester or amide derivatives thereof, wherein $R^1$ is a halogen or a halogen-like group such as chlorine, bromine, fluorine, or a tri-halomethyl group as the trifluoro- or trichloromethyl group, a lower alkoxy radical preferably having from 1 to 5 carbon atoms, a nitro or an amino radical; $R^2$ is hydrogen, a lower alkyl radical advantageously having from 1 to 5 carbon atoms, a lower alkenyl radical also advantageously having from 1 to 5 carbon atoms, an aralkyl radical advantageously a mononuclear aryl-lower alkyl radical, an alkanoyl radical preferably having from 1 to 5 carbon atoms in the chain, an aroyl radical advantageously derived from a mononuclear aryl-mono-carboxylic or dicarboxylic acid, an omega substituted alkyl radical having the structure —$(CH_2)_n$—X wherein $n$ is an integer selected from 2 through 6 and X represents bromine, hydroxyl, an unsubstituted or a substituted amino group such as a mono-lower alkylamino or a di-lower alkylamino, a piperidyl, pyrrolidyl, or morpholinyl radical, or $R^2$ can have the structure —$(CH_2)_m$—COOR wherein R is hydrogen or an esterifying group, such as a lower alkyl radical and $m$ is a whole number from 1 through 4, or $R^2$ can have the structure —OC—$(CH_2)_a$—COOR wherein R has the meaning assigned to it above and $a$ is a whole number from 2 to 4.

The salts of the novel compounds of this invention can be the mono-, di-, or tri-alkali or alkaline earth metal salts, e.g. the sodium, potassium, and the like salts. The esters advantageously are the lower alkyl esters having, for example, from 1 to 5 carbon atoms, and the amides can have the structure —$CONR^3R^4$ where $R^3$ and $R^4$ can be similar or dissimilar and can be hydrogen or lower alkyl groups.

The novel compounds of this invention are useful pharmacotherapeutic agents particularly because of their diuretic, natriuretic and/or saluretic properties (hereinafter referred to as diuretic properties). They can be administered in therapeutic dosages in conventional vehicles as in the form of tablets, pills, capsules, and the like as these compounds are effective upon oral administration. As the compounds of this invention also are soluble in an alkaline medium or in polyethyleneglycol, injectable solutions can be prepared for parenteral administration by dissolving the compound in the selected medium to which preservatives can be added if desired. While dosages between about 5 to about 25 mg./kg./day generally are suitable to produce a diuretic response, more or less of the selected active ingredient can be employed depending upon the age and condition of the individual who is to receive the compound and for this reason scored tablets comprising 0.5 g. of active ingredient or more can be supplied to the physician for the symptomatic adjustment of dosage to the individual patient. These recommended dosages appear to be well below the toxic dose of the disulfamylbenzoic acid compounds of this invention as evidenced by the fact the acute intravenous $LD_{50}$ in mice of one of the compounds falling within the scope of this invention, that is of the compound 5-chloro-2,4-disulfamylbenzoic acid, was found to be greater than 1,000 mg./kg. and no toxic reactions were observed when this compound was administered to dogs, intravenously, at dosages up to 5 mg./kg.

The diuretic properties of the novel compounds of this invention make them particularly useful in the treatment of congestive heart failure and other abnormalities which produce an edematous condition in the body, or which produce an imbalance in the electrolyte concentration in the body as, for example, those in which an abnormal retention of sodium occurs.

The novel disulfamylbenzoic acids of this invention are additionally useful as intermediates in preparing sulfamylsaccharin compounds which also possess diuretic, natriuretic and/or saluretic properties. The conversion of the disulfamylbenzoic acid compounds to the sulfamylsaccharin compounds is described in detail in my copending U.S. patent application, Serial No. 689,027, filed October 9, 1957, now U.S. Patent No. 2,957,883. In general the disulfamylbenzoic acid compounds are cyclodehydrated to the corresponding sulfamylsaccharin compound, advantageously by heating to the melting point of the disulfamylbenzoic acid or by mixing the disulfamylbenzoic acid with sulfuric acid at room temperature or by heating a mixture of the disulfamylbenzoic acid and phosphoryl chloride (phosphorus oxychloride), preferably on a steam bath.

The novel disulfamylbenzoic acid compounds of this invention can be prepared by the methods illustrated below:

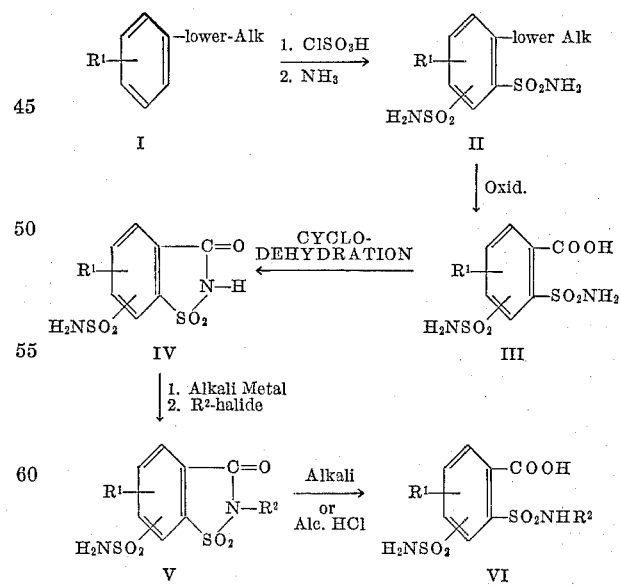

In general, the preparation of the disulfamylbenzoic acid compounds of this invention, structures III or VI above, involves the halosulfonation of the selected compound, I, with chlorosulfonic acid to prepare the disulfonyl chloride derivative which then is converted to the disulfamyl derivative by treatment with ammonia. The disulfamyltoluene compound, II, then is oxidized to convert the methyl group to a carboxyl group thus yielding the disulfamylbenzoic acid compound, III.

The disulfamylbenzoic acid compounds, VI, wherein $R^2$ is any one of the members included in the definition of the variable radical, are advantageously prepared by cyclo-dehydrating compound III to the sulfamylsaccharin compound, IV, which then is converted to its mono-alkali metal salt and then reacted with a compound having the general structure $R^2$-halide to attach the desired substituent, $R^2$, to the nitrogen atom of the saccharin nucleus. The heterocyclic portion of the ring then can be cleaved by treatment with alkali, e.g. an aqueous solution of sodium or potassium hydroxide to yield compound VI or with alcoholic HCl to yield an ester of VI.

The conversion of the selected toluene or other phenylalkyl compound, I, to the disulfamylphenylalkyl compound, II, is accomplished by first halosulfonating compound I with a halosulfonating agent such as chlorosulfonic acid or fluorosulfonic acid advantageously employing an excess of a molar equivalent of the halosulfonating agent and preferably heating the reaction mixture at between about 60–175° C. The disulfonyl halide derivative thus obtained then is treated with ammonia, preferably between about 0° C. to room temperature and then heating the reaction mixture, advantageously on the steam bath, thus forming the disulfamylphenylalkyl compound, II.

The ammonia used in the amidation step is employed in excess of that required to convert each of the sulfonyl halide substituents to the sulfamyl group. Preferably, at least four molecular equivalents of ammonia is employed in this reaction in order to replace each of the halide atoms in the sulfonyl halide groups and to take up the liberated hydrogen halide. Ammonia in substantially any form can be employed in this reaction such as liquid ammonia, concentrated ammonium hydroxide, alcoholic ammonia, or ammonia gas.

The disulfamylphenalkyl compound, II, then is oxidized to the corresponding disulfamylbenzoic acid, III. Oxidation can be effected by a number of oxidizing agents such as potassium permanganate, and chromic anhydride-sulfuric acid mixtures and the like. The reaction, when potassium permanganate is employed, is continued until the characteristic permanganate is employed, is continued until the characteristic permanganate color disappears.

The derivatives of the di-sulfamylbenzoic acid compounds of this invention wherein $R^2$ is a substituent other than hydrogen are prepared by first cyclo-dehydrating compound III to the corresponding sulfamylsaccharin compound, IV, advantageously by heating to the melting point of the disulfamylbenzoic acid or by mixing the disulfamylbenzoic acid with sulfuric acid at room temperature or by heating a mixture of the disulfamylbenzoic acid and phosphoryl chloride (phosphorus oxychloride), preferably on a steam bath. The sulfamylsaccharin compound obtained, compound IV, then is converted to its mono-alkali metal salt, such as the potassium or sodium salt of the saccharin compound, IV. The salt can be prepared by dissolving one equivalent of the selected alkali metal in alcohol and adding the sulfamylsaccharin compound, IV. The reaction mixture is agitated until the saccharin compound dissolves, the solvent then is removed in vacuo, and the residue, which represents the mono-alkali metal salt of the saccharin compound, IV, is dissolved in a solvent, such as dimethylformamide, and the compound $R^2$-halide is added to the reaction mixture. The reaction between these ingredients is exothermic and generally will go to completion if it is stirred until the temperature of the mixture is lowered to about 25° C. In some instances it may be advisable to heat the reaction mixture on the steam bath for about 30–60 minutes to facilitate completion of the reaction. The 2-substituted saccharin compound, V, thus obtained, can be separated, if desired, by diluting the reaction mixture with water and recovering the precipitate. The saccharin compound, either in the reaction mixture or separated therefrom, can be cleaved by reaction with alkali, advantageously sodium or potassium hydroxide, to form the desired disulfamylbenzoic acid, VI, having the substituent $R^2$ attached to the nitrogen atom of the 2-sulfamyl group. The saccharin compound also can be cleaved by treatment with alcoholic hydrogen chloride to give a disulfamylbenzoic acid ester which, upon saponification, is hydrolyzed to the disulfamylbenzoic acid.

The alkali metal salts of the di-sulfamylbenzoic compounds of this invention can be prepared as described above or by any of the conventional methods commonly employed in making salts of acids and sulfonamides. For example, the selected disulfamylbenzoic acid compound can be dissolved in an aqueous or alcoholic solution of the alkali metal hydroxide. The mono-, di-, or tri-salts can be prepared by employing one equivalent, two equivalents, or an excess of the alkali metal hydroxide. Any of the conventional alkali metal salts, such as the sodium, potassium, lithium, or the like salts can be prepared by this method or by other methods known to organic chemists. The alkaline earth metal salts are prepared from the alkali metal salts of the compounds by replacement of the alkali metal by an alkaline earth metal by well known procedures.

The disulfamylbenzoic acid esters are prepared by any of the conventional esterification procedures, for example, by reacting compound III, V, or VI with an alcohol saturated with hydrogen chloride.

The benzamides advantageously are prepared from the esters by reaction with the selected amine preferably at room temperature and elevated pressure.

While the above discussion outlines general methods suitable for the preparation of the disulfamylbenzoic acid compounds of this invention, other methods can, of course, be employed. Also, modifications can be made in the procedural steps described above to improve the conditions for the preparation of any particular compound it is desired to prepare. It is to be understood, therefore, that the above discussion of suitable methods and the following examples, which more fully describe the preparation of the compounds of this invention, are illustrative of the methods which can be employed for the preparation of the novel compound, and are not to be construed as limiting the invention to the particular methods or the particular compounds specifically described.

EXAMPLE 1

*5-Chloro-2,4-Disulfamylbenzoic Acid*

STEP A m-Chlorotoluene (31.8 g.) is added dropwise over a period of 15–20 minutes to 165 ml. of chlorosulfonic acid cooled in an ice bath. After heating the reaction mixture at 150–160° C. for 3 hours, the solution is cooled in an ice bath and then poured onto ice. The solid is collected on the filter, washed with water, and added portionwise to 150 ml. of 28% ammonium hydroxide cooled in an ice bath. The reaction mixture then is heated on the steam bath for 2 hours after which the mixture is cooled and the product which precipitates is collected on the filter and recrystallized from aqueous alcohol yielding 5-chloro-2,4-disulfamyltoluene, M.P. 256–257° C.

Analysis calculated for $C_7H_9ClN_2O_4S_2$: C, 29.52; H, 3.19. Found: C, 29.65; H, 3.10.

STEP B

A solution of 4.9 g. of the thus obtained product in 125 ml. of 5% aqueous sodium hydroxide is heated on the steam bath with 8.8 g. of potassium permanganate with stirring for 30 minutes. The mixture is filtered, acidified, with dilute hydrochloric acid, and concentrated to dryness in vacuo. Recrystallization of the residue from water yields 5-chloro-2,4-disulfamylbenzoic acid, M.P. 200° C. (dec.).

Analysis calculated for $C_7H_7ClN_2O_6S_2$: C, 26.71; H, 2.24; N, 8.90. Found: C, 26.79; H, 2.66; N, 8.71.

The following procedure describes the method by which any of the disulfamylbenzoic acids of this invention can by cyclo-dehydrated to a sulfamylsaccharin compound.

EXAMPLE 2

5-Chloro-6-Sulfamylsaccharin

A solution of 8 g. of the product obtained in Example 1 in 25 ml. of concentrated sulfuric acid is allowed to stand at room temperature for 1 hour. Cold water (100 ml.) is added and the precipitate collected on the filter and recrystallized from 50% alcohol-water to give 5-chloro-6-sulfamylsaccharin, M.P. 273–275° C. (dec.).

Analysis calculated for $C_7H_5ClN_2O_5S_2$: C, 28.33; H, 1.70; N, 9.44. Found: C, 28.53; H, 1.85; N, 9.41.

EXAMPLE 3

5-Fluoro-2,4-Disulfamylbenzoic Acid

By replacing the m-chlorotoluene employed in Example 1 by an equimolecular quantity of m-fluorotoluene, and following substantially the same procedures described in Example 1, Steps A and B, there is obtained 5-fluoro-2,4-disulfamylbenzoic acid.

EXAMPLE 4

5-Bromo-2,4-Disulfamylbenzoic Acid

By replacing the m-chlorotoluene employed in Example 1 by an equimolecular quantity of m-bromotoluene, and following substantially the same procedures described in Example 1, Steps A and B, there is obtained 5-bromo-2,4-disulfamylbenzoic acid.

EXAMPLE 5

5-Ethoxy-2,4-Disulfamylbenzoic Acid

By replacing the m-chlorotoluene employed in Example 1, by an equimolecular quantity of m-ethoxytoluene, and following substantially the same procedures described in Example 1, Steps A and B, there is obtained 5-ethoxy-2,4-disulfamylbenzoic acid.

EXAMPLE 6

5-Butoxy-2,4-Disulfamylbenzoic Acid

By replacing the m-chlorotoluene employed in Example 1 by an equimolecular quantity of m-butoxytoluene, and following substantially the same procedures described in Example 1, Steps A and B, there is obtained 5-butoxy-2,4-disulfamylbenzoic acid.

EXAMPLE 7

5-Nitro-2,4-Disulfamylbenzoic Acid

By replacing the m-chlorotoluene employed in Example 1 by an equimolecular quantity of m-nitrotoluene, and following substantially the same procedures described in Example 1, Steps A and B, there is obtained 5-nitro-2,4-disulfamylbenzoic acid.

EXAMPLE 8

5-Amino-2,4-Disulfamylbenzoic Acid

A solution of 5.0 g. of the 5-nitro-2,4-disulfamylbenzoic acid, obtained as described in Example 7, in 500 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 5-amino-2,4-disulfamylbenzoic acid.

EXAMPLE 9

4-Chloro-2,5-Disulfamylbenzoic Acid

STEP A 4-chlorotoluene-2,5-disulfonyl chloride (0.5 mole) is added portionwise to 150 ml. of 28% ammonium hydroxide cooled in an ice bath. The reaction mixture is heated on the steam bath for two hours after which the mixture is cooled and the product which precipitates is collected on the filter and recrystallized from aqueous alcohol yielding 4-chloro-2,5-disulfamyltoluene.

STEP B

By replacing the 5-chloro-2,4-disulfamyltoluene employed in Example 1, Step B, by an equimolecular quantity of the 4-chloro-2,5-disulfamyltoluene prepared as described above, and following substantially the same procedure described in Example 1, Step B, there is obtained 4-chloro-2,5-disulfamylbenzoic acid.

EXAMPLE 10

Ethyl 2-Beta-Bromoethylsulfamyl-5-Chloro-4-Sulfamylbenzoate

STEP A 5-chloro-6-sulfamylsaccharin (3 g.), prepared as described in Example 2, is dissolved in an alcoholic solution of potassium ethoxide prepared from 0.4 g. of potassium and 50 ml. of anhydrous ethanol. The solution is concentrated to dryness in vacuo and the residue stirred with 20 ml. of dimethylformamide and 1.9 g. of ethylene bromide for 30 minutes. The mixture is heated on the steam bath for 30 minutes, cooled, and diluted with 100 ml. of water. The product which precipitates is collected and recrystallized from ethanol yielding 2-(2-bromoethyl)-5-chloro-6-sulfamylsaccharin.

STEP B

A solution of 0.02 mole of this product in 100 ml. of ethanol saturated with hydrogen chloride is heated under reflux for 2–3 hours and then concentrated to dryness at the water pump. The residue is crystallized from 50% alcohol water to give ethyl 2-beta-bromoethylsulfamyl-5-chloro-4-sulfamylbenzoate.

EXAMPLE 11

2-Gamma-Bromopropylsulfamyl-5-Chloro-4-Sulfamylbenzoic Acid

STEP A

By replacing the ethylene bromide employed in Example 10 by an equimolecular quantity of 1,3-dibromopropane, and following substantially the same procedure described in Example 10, Steps A and B, there is obtained ethyl 2-gamma-bromopropylsulfamyl-5-chloro-4-sulfamylbenzoate.

STEP B

A solution of 0.02 mole of this product in 50 ml. of 10% aqueous sodium hydroxide is heated under reflux for 1-2 hours, cooled in an ice bath and made acid to litmus with dilute hydrochloric acid. The precipitate is collected on the filter, washed with water, and dried to give 2-gamma-bromopropylsulfamyl-5-chloro-4-sulfamylbenzoic acid.

EXAMPLE 12

2-Carboxymethylsulfamyl-5-Chloro-4-Sulfamylbenzoic Acid

STEP A

By replacing the ethylene bromide employed in Example 10, Step A, by an equimolecular quantity of ethyl bromoacetate, and following substantially the same procedure described in Example 10, Step A, there is obtained 2-carbethoxymethyl-5-chloro-6-sulfamylsaccharin.

STEP B

A mixture of 0.02 mole of this product in 100 ml. of 10% aqueous sodium hydroxide is heated under reflux from one to two hours, cooled in an ice bath and made acid to litmus with dilute hydrochloric acid. The precipitate is collected on the filter, washed with water, and dried to give 2-carboxymethylsulfamyl-5-chloro-4-sulfamylbenzoic acid.

EXAMPLE 13

*Ethyl 2-Carbethoxymethylsulfamyl-5-Chloro-4-Sulfamylbenzoate*

A solution of 2-carbethoxymethyl-5-chloro-6-sulfamylsaccharin (10 g.), prepared as described in Example 12, in 100 ml. of alcoholic hydrogen chloride is heated under reflux for 3 hours, and concentrated to dryness in vacuo. The solid residue is collected and recrystallized from aqueous alcohol yielding ethyl-2-carbethoxymethylsulfamyl-5-chloro-4-sulfamylbenzoate.

EXAMPLE 14

*2-Gamma-Carboxypropionylsulfamyl-5-Chloro-4-Sulfamylbenzoic Acid*

By replacing the ethyl bromoacetate employed in Example 12 by an equimolecular quantity of the acid chloride of methyl hydrogensuccinate, and following substantially the same procedure described in Example 12, Steps A and B, there is obtained 2-gamma-carboxypropionylsulfamyl-5-chloro-4-sulfamylbenzoic acid.

EXAMPLE 15

*2-Beta-Hydroxyethylsulfamyl-5-Chloro-4-Sulfamylbenzoic Acid*

To a solution of 4 g. of 2-(2-bromoethyl)-5-chloro-6-sulfamylsaccharin, prepared as described in Example 10, in a mixture of 40 ml. of ethanol and 5 ml. of 10% aqueous sodium hydroxide, heated on the steam bath, 15 ml. of 10% aqueous sodium hydroxide is added dropwise over 30 minutes. After heating for an additional 30 minutes, an additional 15 ml. of 20% aqueous sodium hydroxide is added and heating continued for one hour, the solution then is cooled and neutralized with dilute hydrochloric acid. The precipitate which forms is collected on the filter, washed with water, and dried yielding 2-beta-hydroxyethylsulfamyl-5-chloro-4-sulfamylbenzoic acid.

EXAMPLE 16

*2-Beta-Aminoethylsulfamyl-5-Chloro-4-Sulfamylbenzoic Acid*

A solution of 5 g. of 2-(2-bromoethyl)-5-chloro-6-sulfamylsaccharin, prepared as described in Example 10, in 100 ml. of 10% alcoholic ammonia is heated under reflux for 3 hours. The solution is concentrated to dryness in vacuo and the residue recrystallized from aqueous alcohol yielding 2-(2-aminoethyl)-5-chloro-6-sulfamylsaccharin which when treated with aqueous sodium hydroxide by substantially the same process described in Example 12, Step B, yields 2-beta-aminoethylsulfamyl-5-chloro-4-sulfamylbenzoic acid.

EXAMPLE 17

*2-Beta-n-Propylaminoethylsulfamyl-5-Chloro-4-Sulfamylbenzoic Acid*

A solution of 5 g. of 2-(2-bromoethyl)-5-chloro-6-sulfamylsaccharin, prepared as described in Example 10, in 100 ml. of a 10% alcoholic solution of propylamine is heated under reflux for 3 hours. The reaction mixture is concentrated to dryness in vacuo and the residue recrystallized from aqueous alcohol yielding 2-(2-n-propylaminoethyl)-5-chloro-6-sulfamylsaccharin which when treated with aqueous sodium hydroxide by substantially the same process described in Example 12, Step B, yields 2-beta-n-propylaminoethylsulfamyl-5-chloro-4-sulfamylbenzoic acid.

EXAMPLE 18

*2-Beta-Piperidinoethylsulfamyl-5-Chloro-4-Sulfamylbenzoic Acid*

By replacing the propylamine employed in Example 17 by an equal quantity of piperidine, and following substantially the same procedure described in Example 17, there is obtained 2-beta-piperidinoethylsulfamyl-5-chloro-4-sulfamylbenzoic acid.

EXAMPLE 19

*5-Chloro-2-n-Propylsulfamyl-4-Sulfamylbenzoic Acid*

By replacing the ethylene bromide employed in Example 10, Step A, by an equimolecular quantity of propylbromide, and following substantially the same procedure described in Example 10, Step A, there is obtained 5 - chloro - 2 - n - propylsulfamyl - 4 - sulfamylsaccharin. By treating this product by substantially the same procedure described in Example 12, Step B, there is obtained 5-chloro-2-n-propylsulfamyl-4-sulfamylbenzoic acid.

EXAMPLE 20

*2-Allylsulfamyl-5-Chloro-4-Sulfamylbenzoic Acid*

By replacing the propyl bromide employed in Example 19 by an equimolecular quantity of allyl bromide, and following substantially the same procedure described in Example 19, there is obtained 2-allylsulfamyl-5-chloro-4-sulfamylbenzoic acid.

EXAMPLE 21

*2-Benzylsulfamyl-5-Chloro-4-Sulfamylbenzoic Acid*

By replacing the propyl bromide employed in Example 19 by an equimolecular quantity of benzyl bromide, and following substantially the same procedure described in Example 19, there is obtained 2-benzylsulfamyl-5-chloro-4-sulfamylbenzoic acid.

EXAMPLE 22

*5-Chloro-2-(Beta-Phenylethylsulfamyl)-4-Sulfamylbenzoic Acid*

By replacing the propyl bromide employed in Example 19 by an equimolecular quantity of phenylethyl bromide, and following substantially the same procedure described in Example 19, there is obtained 5-chloro-2-(beta-phenylethylsulfamyl)-4-sulfamylbenzoic acid.

EXAMPLE 23

*Ethyl 2-Butyrylsulfamyl-5-Chloro-4-Sulfamylbenzoate*

By replacing the ethylene bromide employed in Example 10 by an equimolecular quantity of butyryl bromide and following substantially the same procedure described in Example 10, Steps A and B, there is obtained ethyl - 2 - butyrylsulfamyl - 5 - chloro-4-sulfamylbenzoate.

EXAMPLE 24

*Ethyl 5-Chloro-2-Phenylacetylsulfamyl-4-Sulfamylbenzoate*

By replacing the ethylene bromide employed in Example 10 by an equimolecular quantity of phenylacetyl bromide, and following substantially the same procedure described in Example 10, Steps A and B, there is obtained ethyl 5 - chloro - 2 - phenylacetylsulfamyl - 4 - sulfamylbenzoate.

EXAMPLE 25

*Ethyl 5-Chloro-2,4-Disulfamylbenzoate*

Ethanol, 150 ml., is saturated with hydrogen chloride gas by bubbling dry HCl through the ethanol cooled in an ice bath until there is no further increase in weight (about 30 minutes). 5-chloro-2,4-disulfamylbenzoic acid, 5 g., then is added and the mixture is heated under reflux for 2-3 hours and then concentrated to dryness in vacuo at the water pump. The residue is crystallized from a mixture of alcohol and water to give ethyl 5-chloro-2,4-disulfamylbenzoate.

EXAMPLE 26

*5-Chloro-2,4-Disulfamyl-N,N-Dimethylbenzamide*

A suspension of 0.05 mole of ethyl 5-chloro-2,4-disulfamylbenzoate, obtained as described in Example 25, in 100 ml. of ethanol containing 0.5 mole dimethylamine is allowed to stand at room temperature in a pressure bottle for 12–15 hours. The solvent is removed in vacuo and the residue is crystallized from alcohol to give 5-chloro-2,4-disulfamyl-N,N-dimethylbenzamide.

EXAMPLE 27

*5-Chloro-2,4-Disulfamylbenzamide*

A suspension of 0.02 mole of ethyl 5-chloro-2,4-disulfamylbenzoate, prepared as described in Example 25, in 35 g. of alcohol containing 10% by weight of ammonia is allowed to stand for 12–15 hours at room temperature. The solvent is removed in vacuo and the residue is crystallized from ethanol to give 5-chloro-2,4-disulfamylbenzamide.

EXAMPLE 28

*5-Trifluoromethyl-2,4-Disulfamylbenzoic Acid*

A solution of m-trifluoromethylstyrene (0.2 mole) in 300 ml. of ethanol is shaken in an atmosphere of hydrogen in the presence of one gram of 5% palladium on charcoal catalyst until the theoretical quantity of hydrogen for saturation of the ethylenic double bond is absorbed.

After removal of catalyst by filtration, the solution is concentrated and the residue distilled in vacuo to give 3-ethyltrifluoromethylbenzene.

By substituting the 3-ethyltrifluoromethylbenzene obtained as described above for the m-chlorotoluene employed in Example 1, Step A, and following substantially the same procedures described in Example 1, Steps A and B, there is obtained 5-trifluoromethyl-2,4-disulfamylbenzoic acid.

EXAMPLE 29

*5-Trifluoromethyl-6-Sulfamylsaccharin*

The 5-trifluoromethyl-2,4-disulfamylbenzoic acid, obtained as described in Example 28, is heated under reflux for 2 hours with an excess of 98–100% formic acid. After removal of the solvent, the residue is recrystallized from 50% alcohol-water to yield 5-trifluoromethyl-6-sulfamylsaccharin.

EXAMPLE 30

*Di-Sodium Salt of 5-Chloro-2,4-Disulfamylbenzoic Acid*

5-chloro-2,4-disulfamylbenzoic acid (0.1 mole), prepared as described in Example 1, is dissolved in alcoholic sodium hydroxide containing two equivalents of sodium, and the solvent then is evaporated in vacuo yielding the di-sodium salt of 5-chloro-2,4-disulfamylbenzoic acid.

While the above example describes the preparation of the disodium salt of one of the novel compounds of this invention, the mono-, di-, or tri-alkali metal salt of any of the 2,4-disulfamylbenzoic acids of this invention can be prepared by the above process by employing one equivalent, two equivalents, or an excess of the alkali metal-yielding reactant to form the desired alkali metal salt. As discussed above, the alkaline earth metal salts can be made from the alkali metal salts by replacement of the alkali metal by an alkaline earth metal by any of the procedures normally employed for this purpose.

EXAMPLE 31

*Compressed Tablets Comprising 0.5 g. Active Ingredient*

|  | G. |
|---|---|
| 5-chloro-2,4-disulfamylbenzoic acid | 500.0 |
| Starch paste 12½%, 100 cc. allow | 12.5 |
|  | 512.5 |
| Starch U.S.P. corn | 25.0 |
| Magnesium stearate | 5.5 |
|  | 543.0 |

The 5-chloro-2,4-disulfamylbenzoic acid is granulated with the starch paste and while moist passed through a No. 14 screen, dried at 45° C. for 20 hours, and then passed three times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using $^{14}\!/_{32}''$ flat, bevelled, scored punch having a thickness of $0.205 \pm 0.005''$, yielding 1,000 tablets each weighing 0.543 grams and having a hardness of 6 kgms. measured by the Monsanto Chemical Company tablet hardness tester apparatus, and a disintegration time of five minutes when tested on the U.S.P. tablet disintegrating apparatus (U.S. Pharmacopeia, 15th edition, page 937).

Tablets prepared as described above are suitable for oral administration at a dosage regimen individualized for each patient by his physician.

While the above examples describe the preparation of certain compounds illustrated by the structure on col. 1, and a specific dosage form suitable for administering the novel compounds of this invention in human therapy and certain methods suitable for making the disulfamylbenzoic acid compounds of this invention, it is to be understood that the invention is not to be limited by these examples or by the specific reaction conditions described for the preparation of the compounds or by the specific ingredients included in the pharmaceutical preparation, but is understood to embrace variations and modifications falling within the scope of the appended claims.

This application is a continuation-in-part of my co-pending U.S. patent application, Serial No. 689,027, filed October 9, 1957, now U.S. Patent No. 2,957,882.

What is claimed is:

1. A disulfamylbenzoic acid compound selected from the group consisting of a compound having the general structural formula

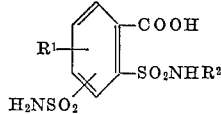

and alkali metal salts and alkaline earth metal salts thereof; wherein $R^1$ is selected from the group consisting of chlorine, bromine, fluorine, trifluoromethyl, a lower alkoxy radical, a nitro and the amino radical; $R^2$ is hydrogen.

2. A disulfamylbenzoic acid compound having the general structural formula

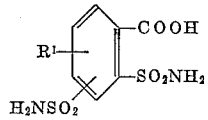

wherein $R^1$ is chlorine.

3. 5-chloro-2,4-disulfamylbenzoic acid.

4. 5-nitro-2,4-disulfamylbenzoic acid.

References Cited in the file of this patent

UNITED STATES PATENTS 2,809,194    Novello    Oct. 8, 1957

OTHER REFERENCES

Taufel et al.: Chem. Absts., vol. 22, p. 3336 (1928).
Shah et al.: Chem. Absts., vol. 28, col. 124–5 (1934).
Basu et al.: Chem. Absts., vol. 33, col. 5852 (1939).
Szabo: Chem. Absts., vol. 48, col. 11379–11380 (1954).